United States Patent [19]

Vaslin et al.

[11] Patent Number: 5,296,470
[45] Date of Patent: Mar. 22, 1994

[54] GRAFT POLYSACCHARIDES AND THEIR USE AS SEQUESTERING AGENTS

[75] Inventors: Sophie Vaslin, Bry/sur/Marne; Christine Vidil, Lyons, both of France

[73] Assignee: Rhone-Poulenc Chimie, Courbevoie, France

[21] Appl. No.: 721,787

[22] Filed: Jun. 26, 1991

[30] Foreign Application Priority Data

Jul. 2, 1990 [FR] France .................. 90 08320

[51] Int. Cl.$^5$ .............. A01N 43/04; A61K 31/715; C08F 110/06; C08F 1/00
[52] U.S. Cl. ...................... 514/54; 430/418; 430/206; 430/213; 426/548; 525/221; 524/428; 526/351; 527/300; 527/305
[58] Field of Search .............. 514/54; 430/418, 206, 430/213; 525/221; 524/428; 426/548; 527/300, 305; 526/351

[56] References Cited

U.S. PATENT DOCUMENTS

| | | | |
|---|---|---|---|
| 3,558,499 | 1/1971 | Galvin et al. | 252/137 |
| 3,766,165 | 10/1973 | Rennhard | 260/209 |
| 3,989,656 | 11/1976 | Kamiya et al. | 260/17.4 |
| 4,013,607 | 3/1977 | Dwyer et al. | 524/428 |
| 4,131,576 | 12/1978 | Iovine et al. | 527/312 |
| 4,263,180 | 4/1981 | Marconi et al. | 525/221 |
| 4,480,025 | 11/1984 | Chang et al. | 430/418 |
| 4,622,233 | 11/1986 | Torres | 426/548 |
| 4,719,272 | 1/1988 | Tsai et al. | 536/4.1 |
| 4,845,035 | 7/1989 | Fanta et al. | 435/95 |
| 4,866,151 | 9/1989 | Tsai et al. | 527/313 |
| 5,049,634 | 9/1991 | Tsai et al. | 527/313 |

FOREIGN PATENT DOCUMENTS

| | | |
|---|---|---|
| 25551 | 3/1981 | European Pat. Off. . |
| 1937575 | 2/1971 | Fed. Rep. of Germany . |
| 2330026 | 1/1975 | Fed. Rep. of Germany . |
| 2277837 | 2/1976 | France . |

OTHER PUBLICATIONS

Chemical Abstracts, vol. 105, No. 2, Jul. 1986, Columbus, Ohio, USA, p. 109, column 1, ref. No. 8363; Japanese Patent Document No. 61-31497 dated Feb. 13, 1986, Sanyo Chemical Industries, Ltd.

Rev. Macromol. Chem. Phys., C22(3), 471–513 (1982–1983); Munmaya K. Mishra.

Rev. Macromol. Chem. Phys., C26(1), 81–141 (1986); Samal et al.

Langmuir, 1987, 3, 224–228; Z. Amjad.

Primary Examiner—Michael G. Wityshyn
Assistant Examiner—Louise N. Leary
Attorney, Agent, or Firm—Finnegan, Henderson, Farabow, Garrett & Dunner

[57] ABSTRACT

Graft polysaccharides comprising a polymer backbone consisting essentially of a polydextrose having an average-weight molecular mass of less than 10,000 and grafts grafted thereon derived from a water-soluble ethylenically unsaturated monomer. The graft polysaccharides are useful as sequestering agents for alkaline-earth metal ions.

13 Claims, No Drawings

GRAFT POLYSACCHARIDES AND THEIR USE AS SEQUESTERING AGENTS

The present invention relates to graft polysaccharides, and their use as sequestering agents for cations, in particular, alkaline-earth metal ions.

The graft polysaccharides which are the subject of the present invention comprise:
  a polymer backbone consisting essentially of a polydextrose having an average-weight molecular mass of less than 10,000, and preferably from 100 to 5,000,
  and from 20 to 70%, preferably from 25 to 35%, by weight of the polymer backbone, of grafts grafted thereon derived from at least one water-soluble ethylenically unsaturated monomer.

Polydextrose is a random glucose polymer containing small amounts of sorbitol and citric acid, obtained by the polycondensation of these three starting materials (i.e., glucose, sorbitol and citric acid). It is used in the foodstuff art as a complement to synthetic sweeteners, and is the subject of U.S. Pat. Nos. 3,766,165 and 4,622,233.

The water-soluble ethylenically unsaturated monomers capable of forming the repeating units of the grafts include those containing at least one hydrophilic group, such as:
  ethylenically unsaturated carboxylic monoacids (e.g., acrylic acid, methacrylic acid and their alkali metal or ammonium salts),
  ethylenically unsaturated carboxylic diacids (e.g., maleic acid, itaconic acid, fumaric acid, crotonic acid and their alkali metal or ammonium salts),
  ethylenically unsaturated carboxylic hydroxyacids (e.g., hydroxyacrylic acid and their alkali metal or ammonium salts),
  ethylenically unsaturated sulphonic acids (e.g., vinylsulphonic acid, allylsulphonic acid and their alkali metal or ammonium salts), and
  ethylenically unsaturated alcohols (e.g., allyl alcohol, and methallyl alcohol).

Preferably, the grafts consist of:
  a homopolymer of acrylic or methacrylic acid,
  a copolymer of acrylic or methacrylic acid and maleic or itaconic acid in a monoacid/diacid molar ratio of 50-95/50-5, preferably 55-90/45-10, or
  an alkali metal (in particular, sodium) or an ammonium salt of the homopolymer or the copolymer.

Advantageously, the grafts contain on the average from 2 to 50, preferably on the average from 10 to 20, monomer units per graft.

The products which are the subject of the present invention may be obtained by any known process for grafting ethylenically unsaturated monomers onto polysaccharides. The grafting, for example, may be effected by irradiation or by free radical polymerization in aqueous solution with the aid of initiators of the hydrogen peroxide or persulphate type, such as sodium persulphate, potassium persulphate or ammonium persulphate, or of a cerium (IV) salt.

One grafting method which performs particularly well is that using a water-soluble or water-dispersible Ce(IV) salt.

The operation takes place in an aqueous medium and preferably in an aqueous solution of nitric or sulphuric acid having an acid concentration of from 0.005 to 0.1 mol/liter. The pH of the reaction mixture is from 1 to 2.

The Ce(IV) salt is preferably ceric nitrate, ceric sulphate, $Ce(SO_4)_4(NH_4)_4$ or $Ce(NO_3)_6(NH_4)_2$.

The mechanism by which unsaturated monomers are grafted onto polysaccharides in the presence of cerium (IV) salts has been described by Munmaya K. Mishra in Rev. Macromol. Chem. Phys., C22(3), 471–513 (1982–1983) and also by Samal et al. in Rev. Macromol. Chem. Phys., C26(1), 81–141 (1986).

The Ce(IV) salt is used generally in an amount of from 10 to 300 mmol of $Ce^{4+}$, preferably from 40 mmol to 250 mmol of $Ce^{4+}$, per 100 g of polydextrose backbone.

The nature of the polydextrose which is subjected to the grafting operation and the water-soluble ethylenically unsaturated monomers used have already been mentioned above.

The amounts of monomer(s) used are from 20 to 70% by weight, preferably from 25 to 35% by weight, relative to the weight of the polydextrose.

The total concentration of polydextrose and ethylenically unsaturated monomer(s) in the aqueous polymerization mixture is such that the latter has a solids content by weight of from 5 to 40%, preferably from 15 to 20%, of its total weight.

The operation of grafting by polymerization is carried out at a temperature of from 20° to 60° C. and more particularly from 35° to 45° C. The polymerization generally takes from 2 to 4 hours.

The operation can be carried out noncontinuously or continuously with continuous introduction of the ethylenically unsaturated monomer or monomers into a base stock containing the aqueous medium, the polydextrose and the initiator. When a mixture of monomers such as acrylic acid and maleic acid is used, some of the acrylic acid and all of the maleic acid can be introduced initially into a base stock containing the aqueous medium, the polydextrose and the initiator and then the remainder of the acrylic acid introduced semi-continuously.

After cooling, the product obtained at the end of the polymerization is in the form of a solution of low viscosity.

The product has numerous properties, in particular:
  sequestering properties for cations, in particular calcium and magnesium
  crystalline growth-inhibiting properties, in particular for calcium carbonate
  dispersing properties for fillers of the calcium carbonate type when the grafts derived from the water-soluble ethylenically unsaturated monomer or monomers are short
  flocculating properties when the grafts are long.

It also has the advantage of being at least partially biodegradable.

The graft polysaccharides that are the subject of the present invention can be used, for example, in the treatment of boilers, as dispersing agents for fillers for the production of paper, paints, cement, plant protection compositions, ceramics, and as flocculating agents for water treatment.

The following examples are given by way of illustration and should not be regarded as limiting the scope or the spirit of the invention.

EXAMPLE 1

The experiment was carried out batchwise in a 100 ml conical flask placed in a KOTTERMAN ® agitation bench (marketed by Labo Service), using:

5 g of partially neutralized polydextrose powder of K type marketed by Pfizer (a 10% aqueous solution has a pH of 5-6). Its molecular distribution by weight is such that almost 90% of the product has a weight molecular mass of less than 5000.

2.5 g of acrylic acid 40 mmol of $Ce^{4+}$ per 100 g of polydextrose, in the form of ammonium $Ce^{IV}$ sulphate 0.035 mol per liter of nitric acid water in the amount required to obtain a solids content of 27% by weight.

The various ingredients were mixed and the solution was brought to 40° C. for two hours and then left to cool.

The capacity of the product obtained for sequestration of calcium ions was measured using an electrode having a selective membrane permeable to calcium ions. A calibration curve was first plotted using 100 ml of a 3 g/l sodium chloride solution of pH 10.5 to which amounts of calcium ions varying from $10^{-5}$ to $3 \times 10^{-3}$ mol/l were added and the curve of the potential supplied by the electrode as a function of the concentration of free $Ca^{2+}$ ions was plotted.

0.1 g of polymer (dry) was then weighed, to which water, in the amount required to obtain 100 g of solution, and 0.3 g of sodium chloride in powder form were added. The pH was then adjusted to about 10.5 using sodium hydroxide in aqueous solution.

The straight line free $[Ca^{2+}]$/fixed $[Ca^{2+}]$ = function (free $[Ca^{2+}]$) was plotted.

Using this straight line, the following was determined:

the complexing constant K of the calcium ions in the polymer the number So of complexing sites in the polymer defined by: $\dfrac{\text{free }[Ca^{2+}]}{\text{fixed }[Ca^{2+}]} = \dfrac{1}{KSo} + \dfrac{1}{So}\text{ free }[Ca^{2+}]$ It is found that the product obtained had:

a number of complexing sites $So = 2 \times 10^{-3}$ sites/g of graft polydextrose.

A complexing constant log K = 3.6

EXAMPLE 2

The operation described in the preceding example was repeated using, as the starting materials:

5 g of polydextrose of K type 10 g of acrylic acid 40 mmol of $Ce^{4+}$ per 100 g of polydextrose, in the form of ammonium $Ce^{IV}$ sulphate 0.035 mol per liter of nitric acid water in the amount required to obtain a solids content of 21% by weight.

The product obtained had:

a number of complexing sites $So = 3.1 \times 10^{-3}$ sites/g a complexing constant log K = 4.1.

The calcium carbonate crystallization-inhibiting property of this product was demonstrated using the method described by Z. Amjad in Langmuir 1987, 3, 224-228.

The determination was carried out in a thermostat-controlled closed cell using a supersaturated solution containing $10^{-3}$ mol/l of sodium bicarbonate and $2 \times 10^{-3}$ mol/l of calcium chloride (pH = 8.6), to which 5 g/l of synthetic calcium carbonate (specific surface area = 80 m²/g; theoretical diameter = 20 nm) were added. The reduction in the rate of crystallization of the calcium carbonate obtained by addition of 500 ppm (expressed as the solid) of the graft polydextrose prepared above was determined.

It was found that the ratio:

desorption constant $k_d$/adsorption constant $k_a$ = 0.06

EXAMPLE 3

The experiment was carried out semi-continuously at 40° C. in a 250 ml reactor. A base stock was formed using:

15 g of polydextrose of K type 0.065 mol per liter of nitric acid 0.83 g of ammonium $Ce^{IV}$ nitrate 97 g of water.

The following were introduced semi-continuously over the course of 1 hour 7.5 g of acrylic acid 7.5 g of water The solids content of the mixture was 16% by weight. The mixture was kept at 40° C. for an additional 1 hour.

The product obtained had:

a number of complexing sites $So = 2 \times 10^{-3}$ sites/g a complexing constant log K = 4.1

EXAMPLE 4

The experiment described in Example 3 was carried out using a base stock containing:

15 g of polydextrose of K type 0.06 mol per liter of nitric acid 17.75 g of ammonium $Ce^{IV}$ nitrate 97 g of water and introducing 7.5 g of acrylic acid 7.5 g of water semi-continuously into the base stock.

The solids content of the mixture was 22% by weight.

The product obtained had:

a number of complexing sites $So = 1.1 \times 10^{-3}$ sites/g a complexing constant log K = 4.2

EXAMPLE 5

The operation described in Example 1 was carried out using:

5 g of polydextrose of K type 2.5 g of acrylic acid 80 mmol of $Ce^{4+}$ per 100 g of polydextrose, in the form of ammonium $Ce^{IV}$ sulphate 0.035 mol/l of nitric acid water in the amount required to obtain a solids content of 20% by weight.

The product obtained had:

a number of complexing sites $So = 1.4 \times 10^{-3}$ sites/g a complexing constant log K = 3.9

Its calcium carbonate crystallization-inhibiting property corresponded to a ratio:

desorption constant $k_d$/absorption constant $k_a$ = 0.11

EXAMPLE 6

The operation described in Example 1 was carried out using:

5 g of polydextrose of K type 2.5 g of acrylic acid 10 mmol of $Ce^{4+}$ per 100 g of polydextrose, in the form of ammonium $Ce^{IV}$ nitrate 0.06 mol/l of nitric acid water in the amount required to obtain a solids content of 20% by weight.

The product obtained had:
a number of complexing sites $So = 1.5 \times 10^{-3}$ sites/g
a complexing constant log $K = 4.1$ The "final" biodegradability of this product was determined in accordance with the AFNOR standard T90-312 (in conformity with the international standard ISO 7827).

The test was carried out using, as starting materials:

an inoculum obtained by filtration of feed water from the municipal treatment station of Saint Germain au Mont d'Or (Rhone).

a test medium containing $4 \times 10^7$ bacteria/ml an amount of product to be tested such that the test mixture contained a concentration of organic carbon of 40 mg/l.

The degree of biodegradability of the product tested as a function of time is as follows:

| TIME (days) | BIODEGRADABILITY (%) |
| --- | --- |
| 0 | 0 |
| 2 | 13 |
| 5 | 31 |
| 9 | 31 |
| 13 | 33 |
| 22 | 44–47 |
| 28 | 44–47 |

EXAMPLE 7

The operation described in Example 1 was repeated using, as starting materials:

5 g of polydextrose of K type 2.5 g of acrylic acid 100 mmol of $Ce^{4+}$ per 100 g of polydextrose, in the form of ammonium $Ce^{IV}$ sulphate 0.03 mol/l of nitric acid water in the amount required to obtain a solids content of 20%.

The product obtained had:
a number of complexing sites $So = 2 \times 10^{-3}$ sites/g
a complexing constant log $K = 3.5$
a degree of biodegradability as a function of time of

| TIME (days) | BIODEGRADABILITY (%) |
| --- | --- |
| 0 | 0 |
| 7 | 46 |
| 14 | 53 |
| 21 | 53 | a desorption constant $k_d$/absorption constant $k_a$ ratio $= 0.11$

What is claimed is:

1. Graft polysaccharides comprising:
   a polymer backbone consisting essentially of a polydextrose having an average-weight molecular mass of less than 10,000,
   and 20 to 70% by weight grafts derived from at least one water-soluble ethylenically unsaturated monomer, wherein said grafts are grafted onto said polymer backbone and said weight percent is based on the total weight of said polymer backbone.

2. Graft polysaccharides according to claim 1, wherein said polydextrose has an average-weight molecular mass of from 100 to 5,000, and wherein 25 to 35% by of weight said grafts are present.

3. Graft polysaccharides according to claim 1, wherein said grafts contain from 2 to 50 monomer units per graft.

4. Graft polysaccharides according to claim 1, wherein said water-soluble ethylenically unsaturated monomer is selected from the group consisting of
   an ethylenically unsaturated carboxylic monoacid,
   an ethylenically unsaturated carboxylic diacid,
   an ethylenically unsaturated carboxylic hydroxy acid,
   an ethylenically unsaturated sulphonic acid,
   an alkali metal or ammonium salt of these acids, and
   an ethylenically unsaturated alcohol.

5. Graft polysaccharides according to claim 4, wherein said water-soluble ethylenically unsaturated monomer is selected from the group consisting of
   acrylic acid,
   methacrylic acid,
   a mixture of acrylic or methacrylic acid as a monoacid and a maleic or itaconic acid as a diacid in a monoacid/diacid molar ratio of 50-95/50-5, and
   an alkali metal or ammonium salt of these acids.

6. A sequestering agent for cations comprising:
   a polymer backbone consisting essentially of a polydextrose having an average-weight molecular mass of less than 10,000,
   and 20 to 70% by weight of grafts derived from at least one water-soluble ethylenically unsaturated monomer, wherein said grafts are grafted onto said polymer backbone and said weight percent is based on the total weight of said polymer backbone.

7. A sequestering agent for alkaline-earth metal ions comprising:
   a polymer backbone consisting essentially of a polydextrose having an average-weight molecular mass of less than 10,000,
   and 20 to 70% by weight grafts derived from at least one water-soluble ethylenically unsaturated monomer, wherein said grafts are grafted onto said polymer backbone and said weight percent is based on the total weight of said polymer backbone.

8. Graft polysaccharides according to claim 1, wherein said polydextrose has an average-weight molecular mass of from 100 to less than 10,000.

9. Graft polysaccharides according to claim 1, wherein said grafts contain from 1 to 50 monomer units per graft.

10. A sequestering agent according to claim 6, wherein said polydextrose has an average-weight molecular mass of from 100 to less than 10,000.

11. A sequestering agent according to claim 6, wherein said grafts contain from 1 to 50 monomer units per graft.

12. A sequestering agent according to claim 7, wherein said polydextrose has an average-weight molecular mass of from 100 to less than 10,000.

13. A sequestering agent according to claim 7, wherein said grafts contain from 1 to 50 monomer units per graft.

* * * * *

UNITED STATES PATENT AND TRADEMARK OFFICE
CERTIFICATE OF CORRECTION

PATENT NO. : 5,296,470
DATED : March 22, 1994
INVENTOR(S) : Sophie Vaslin et al.

It is certified that error appears in the above-indentified patent and that said Letters Patent is hereby corrected as shown below:

Claim 1, column 5, line 65, after "weight", insert --of--.

Signed and Sealed this

Ninth Day of May, 1995

Attest:

BRUCE LEHMAN

Attesting Officer      Commissioner of Patents and Trademarks